Patented July 25, 1933

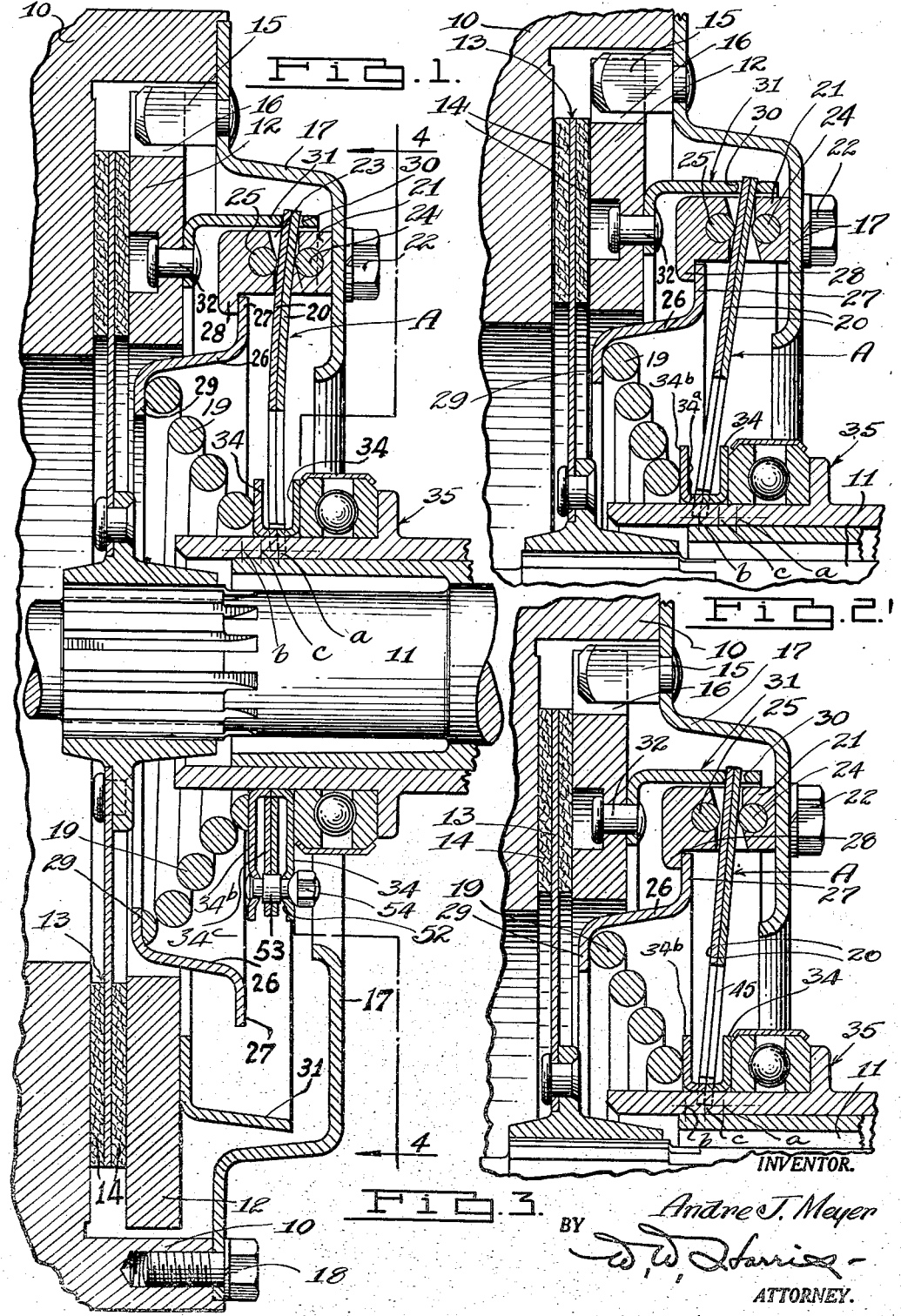

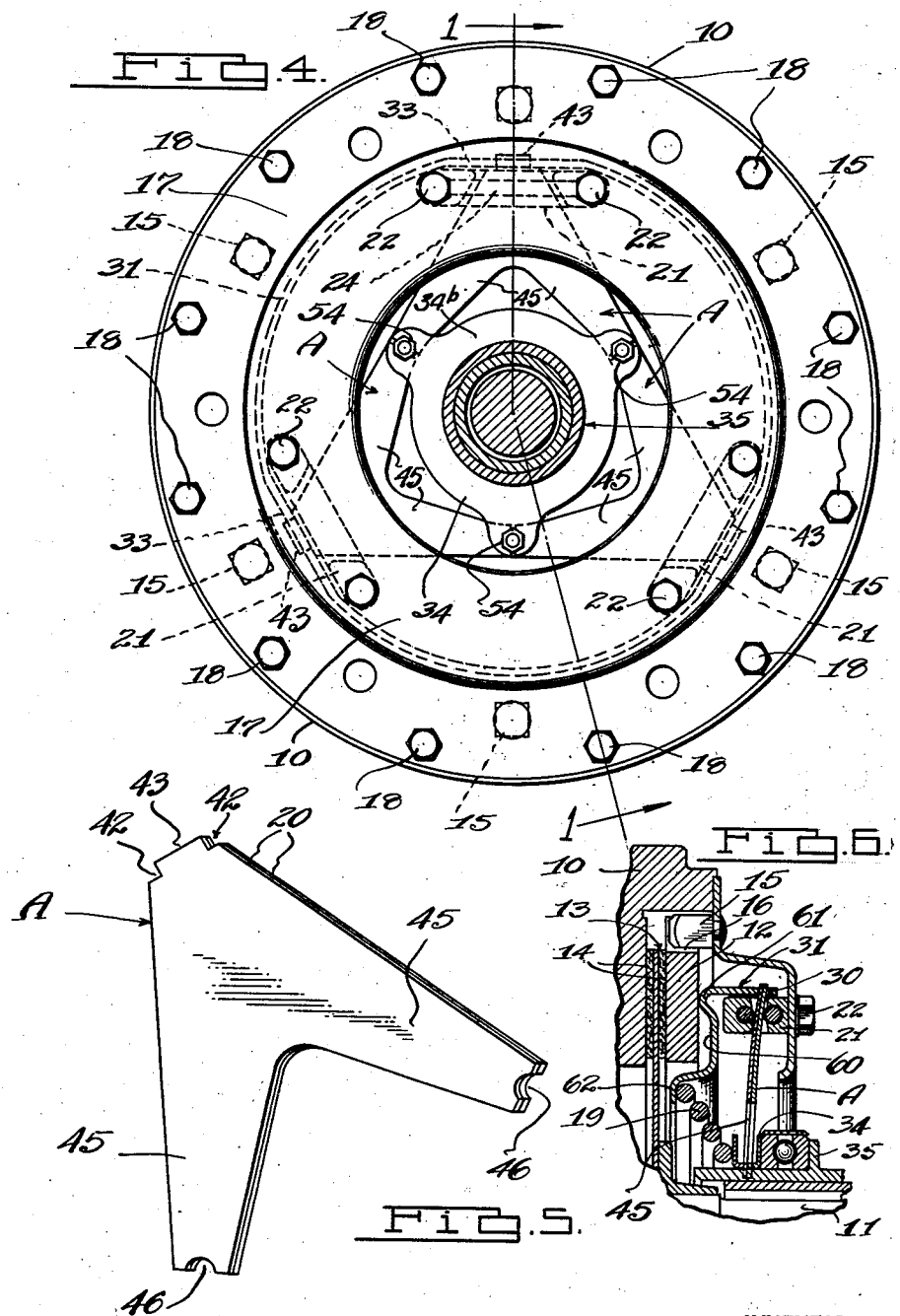

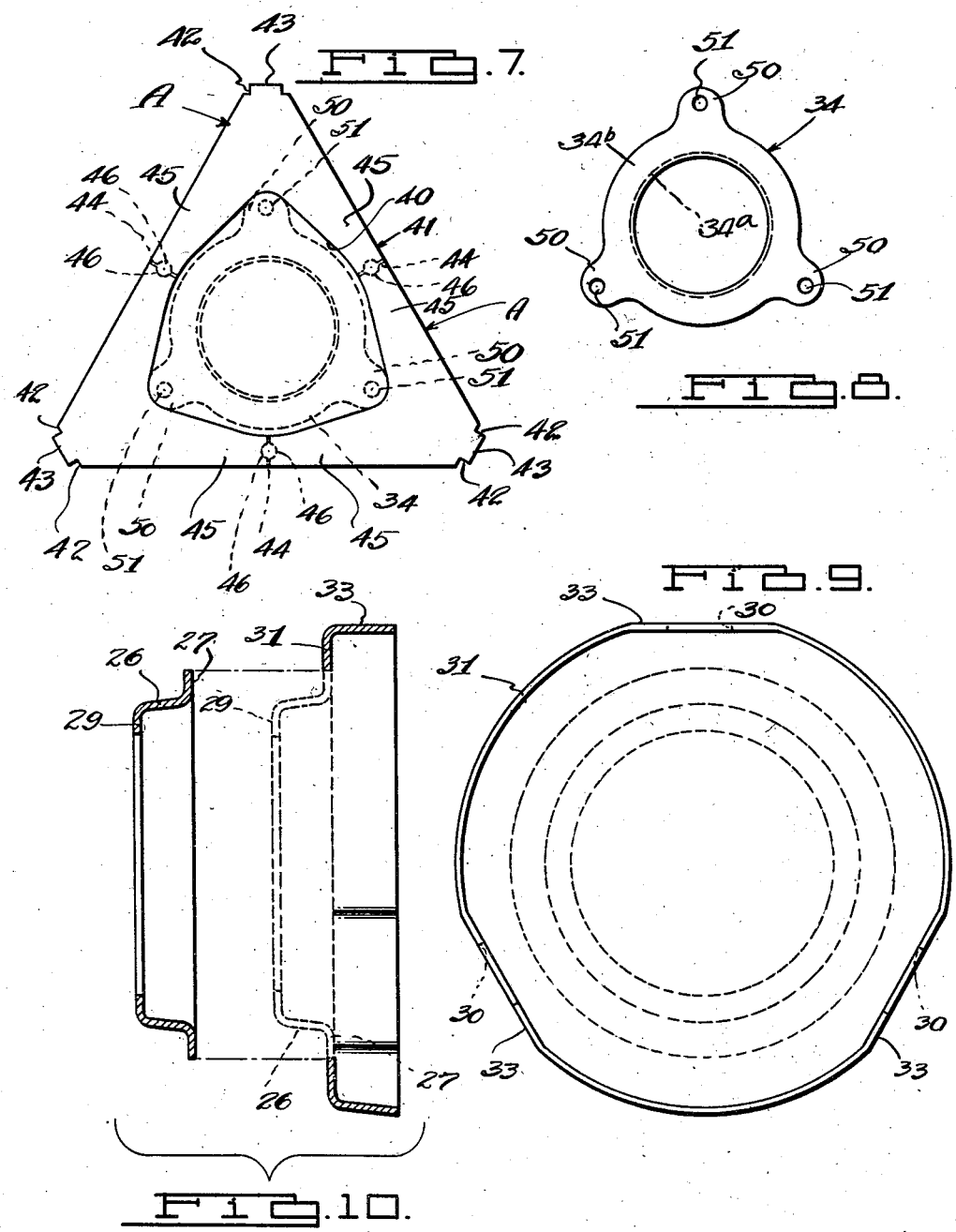

1,919,523

UNITED STATES PATENT OFFICE

ANDRE J. MEYER, OF DETROIT, MICHIGAN, ASSIGNOR TO CONTINENTAL MOTORS CORPORATION, OF DETROIT, MICHIGAN, A CORPORATION OF VIRGINIA

CLUTCH

Application filed December 13, 1930. Serial No. 502,189.

My invention relates to clutches for use in automobiles and other like vehicles and more particularly to clutches of the non-grabbing type, and obviously the principle of my invention may be incorporated in machines other than automobiles or the like.

Clutches of the non-grabbing type have become an essential part of automobile structures, since this type of clutch permits a vehicle to be started and the changing of gears without objectionable chattering or uneven operation, the clutch automatically operating to gradually engage the driving and driven elements of the clutch independently of the pedal operation. This has been usually sought to be accomplished by constructing the clutch in such a way, that only a relatively small area of the driven clutch disc is initially engaged with the driving element, the area of the engaged portions being gradually increased during the clutching action to effect a gradual engagement of the clutch. Such constructions are subjected to uneven wear and as a result the clutch facings of the clutch disc or driven member are rapidly worn, this wear decreasing the efficiency of the clutch as well as requiring a more frequent adjustment or replacement of some of the clutch elements, especially the clutch disc. In large vehicles such as trucks and busses, this wear is much more pronounced, due to the heavier loads, thereby necessitating a more frequent replacement or adjustment of parts in order to maintain the clutch in working order.

It is the object of my invention to provide a clutch having generally improved clutching characteristics.

It is the object of my invention to construct a more efficient and improved type of clutch for substantially all types of machines, automobiles and other like vehicles by providing a clutch structure in which a gradual smooth non-grabbing engagement of the driving and driven members of the clutch is made possible without causing excessive wear of the clutch parts, thereby providing a clutch of relatively longer life and in which frequent adjustments or replacements of worn parts are unnecessary.

Another object of my invention is to construct a non-grabbing clutch device of the type in which the driving and driven elements are initially engaged preferably with full surface contact and in which a clutching pressure is built up to effect a gradual engagement of the clutch driving and driven elements.

A further object of my invention is to construct an improved clutch of the aforesaid type by providing yielding means incorporated in the clutch pressure transmitting means for more efficiently transmitting a substantially uniformly increasing pressure to the clutch driving element during the clutching action.

A still further object of my invention is to provide an improved clutch of the aforesaid type by providing a novel yieldable lever structure for yieldingly transmitting the clutching pressure.

Still further objects of my invention are to facilitate the economical manufacture of a clutch by providing novel and economical methods for manufacturing some of the clutch parts.

For a more detailed understanding of my invention reference may be had to the accompanying drawings illustrating preferred embodiments of my invention, and in which:

Figure 1 is a longitudinal sectional view through a clutch constructed in accordance with my invention, and showing the driving and driven elements of the clutch in full engagement, Figure 2 is a fragmentary sectional view of the clutch showing the same disengaged, Figure 3 is a fragmentary sectional view of the clutch showing the clutch parts located in an intermediate position when the driving element has been moved into initial engagement with the driven element, Figure 4 is a rear elevational view of the clutch taken substantially on the line 4—4 of Figure 1, Figure 5 is a detail view in perspective of one of the spring levers, Figure 6 is a fragmentary sectional view illustrating a modified form of clutch construction, Figure 7 is a plan view of the blank from which the clutch levers are stamped illustrating how a plurality of clutch parts including a plurality of levers and additional clutch parts may be stamped from the same blank, Figure 8 is a plan view of the load applying means stamped out of the central portion of the blank from which the levers are formed, Figure 9 is a plan view of a partially formed blank illustrating how two other members of the clutch assembly such as the thrust ring and spring abutment may be formed, and Figure 10 is a longitudinal sectional view illustrating a method by which one clutch member may be stamped out from the stock remaining from the formation of another clutch member, particularly illustrating the spring abutment member formed from the same blank from which the thrust member is formed.

In general a clutch consists of driving and driven members such as a flywheel 10 and a shaft 11 which are adapted to be selectively engaged in driving relation through the medium of a clutching device. This clutching device is composed in general of a driving element such as a pressure plate 12 and a driven element such as the clutch disc 13, respectively connected in driving connection with the driving and driven members. The driven element is adapted to be packed between the pressure plate and flywheel, said driven element or clutch disc having clutch facings 14 mounted on either side of the clutch disc and which are adapted for frictional engagement with the pressure plate and flywheel. The pressure plate or driving element 12 is preferably driven by the flywheel 10 by means of a plurality of driving lugs 15 adapted for engagement in slots 16 carried by the pressure plate, these driving lugs being shown in the illustrated embodiment of my invention as being carried by a cover plate 17 which may be secured to the flywheel by means of bolts 18 or other suitable fastening devices. Means are provided as a source of energy for urging the pressure plate or driving element into engagement with the clutch disc or driven element, this means in general comprising a yielding means or spring 19 so constructed and arranged to apply pressure as more particularly described hereinafter to the driving element to effect a driving engagement between said driving and driven elements.

A pressure transmitting means is provided for transmitting the pressure of the spring 19 to the driving element of the clutch and my invention is more particularly related to the devices for transmitting such pressure, and in general, my device is constructed to yieldingly transmit this pressure in such a way that a substantially uniformly increasing pressure is applied to the driving element during the clutching action for effecting a gradual engagement of the driving and driven elements of the clutch. This is accomplished in my device by providing a yielding means intermediate the spring 19 and the driving element 12. The pressure transmitting means comprises preferably a number of cooperating clutch elements, one of such elements being preferably constructed to yield, and I find this feature may be conveniently incorporated in one or more pressure multiplying levers A interposed between the spring and the driving member, said levers being adapted to be fulcrumed to the cover plate and arranged to transmit the pressure in a predetermined ratio, said levers being constructed to provide a suitable multiplying ratio.

I preferably employ a laminated lever A which consists of two or more sheet metal spring elements 20 which are preferably similarly constructed and act together in a manner which will be later described in more detail. Preferably, the cover plate is provided with a fulcruming member 21 which may consist of a member secured to the cover plate by means of bolts or other suitable fastening devices 22, said fulcrum member being provided with a slot 23 through which said lever A may be projected, and provided with hardened lever bearing inserts 24 and 25, these inserts preferably consisting of hardened rollers which may be secured in any suitable manner to the fulcrum member. A spring abutment member 26 is shown anchored to these fulcrum members though obviously other means may be provided for supporting the abutment member from another element of the clutch assembly, the abutment member being anchored in a fixed relation relative to the cover plate. Obviously other types of fulcrum members may be employed for this purpose if so desired within the broader aspects of my invention.

The abutment member is anchored to the fulcrum member in the illustrated embodiment of my invention by engaging the outwardly extending annular flange 27 of the abutment member with projecting lugs 28 carried by the fulcrum members, the body portion of said abutment member extending forwardly of the clutch assembly into the zone located interiorly of the driving element and provided with an inwardly extending flange 29 adapted to form an abutment for the spiral coil spring 19.

The outer end of each lever A actuates a thrust member 31 by engagement in a slot 30 carried by the thrust member, this thrust member being associated with the driving element 12 and may or may not be rigidly attached thereto, Figures 1 and 6 showing alternatives in this respect. In Figure 1, I permanently attach this thrust member or ring to the driving element by means of rivets or other suitable fastening devices 32. This thrust member preferably consists of an annulus or ring which surrounds the driven member or shaft 11 and is preferably arranged concentrically therewith and with the annular pressure plate or driving element 12 and the annular spring abutment member 26. At points on the periphery of the thrust member the same is flattened as at 33, the slots 30 being preferably formed in these flattened portions 33 of the thrust member. The inner end of each of the levers A is engaged with a load applying means or lever positioning stampings 34, said means being adapted to be actuated by the spiral coil spring 19, which applies a force to the inner end of each lever A, said force being multiplied and transmitted to the thrust member 31 for transmission to the driving element of the clutch.

As stated above I have provided a plurality of laminated spring levers, each lever being constructed of a plurality of sheets of spring material, this laminated lever structure being capable of being flexed in transmitting the load of the spring 19 to the driving element through the intermediate thrust member 31. The operation of the clutch is illustrated in Figures 1, 2 and 3 and the operation thereof may be best described by explaining the action of the cooperating clutch elements in moving from a disengaged position as illustrated in Figure 2 to an engaging position as illustrated in Figure 1. In Figure 2 the coiled spiral spring 19, which may be referred to as the primary yielding means, is compressed by means of a clutch releasing means or collar 35 which is shown in Figure 2 as being moved inwardly to the limit of its movement. This collar has thus moved the lever in such a way as to move the driving element 12 out of engagement with the driven element 13, Figure 2 illustrating the clearance between the driven element 13 and the driving element 12 and the flywheel 10. On engaging the clutch the collar is moved outwardly by suitable actuating means such as a clutch pedal (not shown) and thus the stored energy or pressure in the primary yielding means or spring 19 is partially released the spring lever A being moved a distance sufficient to move the driving element for taking up the clearance between the clutch disc 13 and the adjacent driving element and flywheel, but it may be noted that on initial contact of the driving element with the driven element or clutch disc, that substantially zero pressure is exerted between the driving and driven elements due to the nature and construction of the lever. This lever is constructed of spring material and may flex and be deflected in response to the spring 19. Thus, as the clutch collar is further moved outwardly the spring 19 is permitted to expand and the lever A is ultimately deflected or flexed as illustrated in Figure 1 and the flexing of this lever takes place as spring 19 expands, the flexing building up pressure applied to driving element 12. The pressure between the driving and driven elements is thus gradually built up from substantially zero at the time of their initial contact to a maximum at the time of their full pressure contact this pressure being substantially uniformly increased during the clutching action of the driving and driven elements. Preferably this building up of the pressure takes place substantially throughout the range of the clutching action. The spring lever may be referred to as a high rate spring and the primary yielding means or spring 19 may be referred to as a low rate spring, the definition of "rate" being the deflection per inch of spring travel.

Because of space limitations and the desirability of providing a clutch of relatively small size and low cost with an appreciable travel of the clutch releasing means, the actuating levers must ordinarily be limited as at their length so that where the levers have yielding characteristics in the nature of a secondary yielding means as provided by my invention I deem it desirable to form such levers as a laminated structure. Thus the levers will properly carry the load necessary and also provide the yielding qualities without necessitating material alterations in the general clutch dimensions or travel of the clutch releasing means.

I have provided a novel lever construction which may be very economically manufactured from sheet metal, said metal preferably comprising a good quality spring steel capable of transmitting the load without danger of becoming permanently deformed. I preferably provide a blank which is illustrated in the accompanying drawings as substantially triangular in shape, though obviously other figures with more or less sides may be employed if so desired. Referring to Figures 7 to 10 inclusive, illustrating the method of manufacture of some of the cooperating parts of the clutch assembly it will be seen how this triangular shaped blank may be formed into a plurality of lever structures. The blank is pierced or cut out in such a way as to provide a central opening 40, thereby forming a substantially irregularly shaped continuous annular structure 41, the apexes of the blank being formed as shown at 42 with tongues 43 adapted to form lips for insertion in the slots 30 of the thrust member 31. That portion of the annular member connecting adjacent apexes is relatively narrow and preferably this narrow bridge portion is severed as at 44 to provide a plurality of forked lever members 45, the ends of said levers being recessed as at 46 for a purpose which will be more apparent hereinafter. The load applying means engaging the inner ends of said levers is stamped or formed from the material taken out of the central portion of the blank 41. Figure 7 illustrates how this load applying means 34 may be cut out of this material in such a way as to eliminate the maximum amount of scrap material which is substantially a loss to the manufacturer. Applicant has thus utilized in an improved way the available material and such a construction as described above provides an economically manufactured product. The load applying means 34 is formed by a pair of annular angle stampings 34 one of which is shown in Fig. 8. Each stamping has an annular flange $34^a$ surrounding collar 35, these flanges contacting whereby they cooperate with the radial flanges $34^b$ of each stamping to locate the lever ends in the annular space $34^c$ provided by the stampings. Each stamping 34 is provided with ears 50 through which holes 51 are formed. The stampings 34 together form annular space $34^c$ which is generally U-shaped at its bounding walls as defined by flanges $34^a$ and $34^b$. Preferably the material about the holes 51 is depressed as at 52 (see Figure 1) and a bolt or pin 53 is passed through the hole 51 and engaged in the semi-circular recesses 46 carried at the end of the forked levers 45, a nut 54 being utilized to clamp the ends of the spring levers to the load applying means 34.

The spring levers are preferably constructed substantially similar and are so arranged as to be similarly flexed or deflected during the clutching action. Furthermore it will be noted that the lever is moved bodily with little or no flexing on moving the driving element from the position illustrated in Figure 2 to that illustrated in Figure 3. Following this initial engagement or contact of the driving and driven elements, the outer end of the lever remains substantially relatively motionless while the inner end of the lever is moved further to effect the final clutching action. Thus the inner end of the lever moves through a greater arc than the other end of the lever.

On de-clutching, the initial operation of the clutch pedal, moves the inner end of the lever means compressing spring 19 and progressively unloading the lever whereby it will straighten out while maintaining the driving and driven elements in contact. On further actuation of the clutch pedal, the lever means functions substantially as a rigid lever and retracts the driving element from engagement with the driven element.

In Figures 1, 2 and 3 I have indicated the three positions which the inner end of the lever means will assume when the clutch is respectively fully engaged, fully disengaged, and when the driving element is initially moved into contact with the driven element. These positions are respectively indicated at "a", "b", and "c".

The levers are constructed of spring material which provides a very economical construction though obviously I do not limit myself to the exact showing as illustrated in the drawings since other means may be provided for providing a yieldable lever that will serve to build up a pressure as desired for transmission to the driving element of the clutch assembly.

The levers A are preferably "straight line" levers when unloaded, as viewed in Fig. 2, and the levers are further preferably "flat" to best provide for the desired flexing and they preferably extend generally radially outwardly from the driven shaft 11 so as to lie generally transversely of or generally perpendicularly with the axis of the driven shaft. This arrangement of levers is in contrast with levers arranged to extend generally longitudinally of the axis of a driven shaft. The inner ends of the levers are thus grouped about the driven shaft as viewed in Fig. 4. The inner ends of the levers 45 may be arranged somewhat tangentially of shaft 11 in order to increase their effective length over a true radial arrangement. Further, by reason of the arrangement of my flat levers extending generally radially outwardly from the driven shaft, as set forth in certain of my claims, the parts of the clutch may be very compactly arranged since the disc 13, pressure plate 12, and levers A may be arranged approximately in parallelism as viewed in Fig. 1.

Other elements of the clutch such as the thrust member 31 and abutment member 26 may also be stamped out of a single blank, the construction of these elements being such that the spring abutment member 26 may be formed from the material remaining from the forming operation which forms the thrust member 31. If desired these two members may be formed in one stamping operation in a novel manner as illustrated in Figure 10 and then cut to separate the same.

It will be noted in the assembly shown in Figure 1 that the body portion of the abutment member projects through the central opening of the thrust member 31, thereby forming an abutment for the spring 19 which is well forward of the rear part of the clutch assembly thereby providing a compact clutch assembly having a relatively small dimension axially of the driven member 11.

In Figure 6 I have illustrated a modified form of construction in which the thrust member and spring abutment are combined together in the same element. In this construction I have provided a thrust member 60 which is provided with an annular rib or beaded portion 61 adapted for engagement with the driving element or pressure plate, but not rigidly secured thereto being provided with a flange constructed similarly to the flange of element 31 to which the lever is engaged being extended inwardly to form a spring abutment 62.

The cover plate 17 and abutment member 26 constitute inwardly and outwardly opening cupped members spaced radially of shaft 11 and overlapping by reason of the telescoping or nested positioning of these cupped members. The abutment 26 is telescoped with the pressure plate 12.

With respect to the details of construction illustrated in the accompanying drawings, such details illustrate a preferred embodiment of the invention, and I wish it understood that various modifications and changes may be made therein without departing from the spirit of my invention or the scope of the appended claims.

What I claim as my invention is:

1. In a clutch, a driven element, a driving element, one of said elements being movably engageable and disengageable with the other to effect clutch engagement and disengagement, means for moving said movable element in opposite directions, said means including a yielding laminated device.

2. In a clutch, a driven element, a driving element, one of said elements being movably engageable and disengageable with the other to effect clutch engagement and disengagement, means for moving said movable element including a yielding laminated lever.

3. In a clutch, a driven element, a driving element, one of said elements being movably engageable and disengageable with the other to effect clutch engagement and disengagement, means for moving said movable element including a plurality of substantially flat secondary spring levers adapted to flex together a predetermined amount during clutch engagement, and primary yielding means acting on said levers.

4. In a clutch, a driving assembly and a driven element, a pressure plate included in said assembly, a laminated lever fulcrumed on said assembly and adapted to move the pressure plate into clutching action with said driven element, spring means intermediate said assembly and said lever, said spring means being adapted to spring said lever to apply pressure to said pressure plate.

5. A clutch comprising a driven element, a driving element, one of said elements being movably engageable and disengageable with the other to effect clutch engagement and disengagement, a lever extending substantially radially of the axis of said driven element and adapted to actuate said movable element, yielding means actuating said lever, said lever being relatively unsprung during movement of said movable element into engagement with the other of said elements, said lever thereafter springing from its normal position whereby the energy of said yielding means progressively flexes said lever to thereby build up a predetermined pressure between said elements.

6. A clutch comprising a driven element, a driving element, one of said elements being movably engageable and disengageable with the other to effect clutch engagement and disengagement, means for moving said movable element including a laminated lever adapted during clutch engaging action to have one of its ends movable through a relatively small angle and the other of its ends movable through a relatively greater angle.

7. A clutch comprising a driven element, a driving element, one of said elements being movably engageable and disengageable with the other to effect clutch engagement and disengagement, a lever actuating said movable element, said lever extending generally transversely of the axis of said driven element, yielding means actuating said lever, said yielding means transferring its stored energy during clutch engaging action to said lever, the lever being constructed to bend and thereby yieldingly build up a pressure contact between said elements, said elements receiving at least half their normal pressure by said lever bending.

8. In a clutch, driving and driven elements relatively movable into clutch engaging and disengaging relation, means including a lever having one end adapted for moving one of said elements, and yielding means acting on said lever at its other end, the first said lever end moving one of said elements into contact with the other for initial clutch engaging action and thereafter remaining relatively motionless while the other said end of the lever is progressively sprung during the clutch engaging action under the influence of said yielding means for causing said first lever end to exert an increasing pressure on said movable element.

9. In a clutch the combination of driving and driven members, driving and driven elements respectively connected for driving connection with said driving and driven members, a cover plate connected with the driving member, a fulcrum member carried by said cover plate, a lever fulcrumed on said fulcrum member and having its load end connected to move said driving element, yielding means acting on said lever, and means carried by said fulcrum member providing an abutment for said yielding means.

10. In a clutch, driving and driven elements relatively movable into clutch engaging and disengaging relation, means including a lever having one end adapted for moving one of said elements, and yielding means acting on said lever at its other end, the first said lever end moving one of said elements into contact with the other for initial clutch engaging action and thereafter remaining relatively motionless while the other said end of the lever is progressively moved under the influence of said yielding means during the clutch engaging action for causing said first lever end to exert an increasing pressure on said movable element.

11. In a clutch, the combination of a driving flywheel and driven shaft, a driven disc carried by said shaft, a pressure plate around said shaft, levers driven by said flywheel having their ends surrounding said shaft, fulcrum means for said levers, yielding means adapted to actuate said levers for moving said pressure plate, and means associated with said fulcrum means and overlapping said pressure plate axially of said shaft for providing an abutment for said yielding means.

12. In a clutch, the combination of a driving flywheel and driven shaft, a driven disc carried by said shaft, a pressure plate around said shaft, levers driven by said flywheel having their ends surrounding said shaft, fulcrum means for said levers, yielding means adapted to actuate said levers for moving said pressure plate, and an outwardly cupped member anchored by said fulcrum means and providing an abutment for said yielding means.

13. In a clutch, the combination of a driving flywheel and driven shaft, a driven disc carried by said shaft, a pressure plate around said shaft, levers driven by said flywheel having their ends surrounding said shaft, fulcrum means for said levers, yielding means adapted to actuate said levers for moving said pressure plate, and an outwardly cupped member anchored by said fulcrum means and providing an abutment for said yielding means, said outwardly cupped member overlapping the pressure plate axially of said shaft.

14. In a clutch, the combination of a driving flywheel and driven shaft, a driven disc carried by said shaft, a pressure plate around said shaft, levers driven by said flywheel having their ends surrounding said shaft, fulcrum means for said levers, an inwardly opening cupped cover plate, an outwardly cupped member located in position by said fulcrum means, and yielding means intermediate said outwardly cupped member and said lever ends.

15. In a clutch, the combination of a driving flywheel and driven shaft, a driven disc carried by said shaft, a pressure plate around said shaft, levers driven by said flywheel having their ends surrounding said shaft, fulcrum means for said levers, an inwardly opening cupped cover plate, an outwardly cupped member located in position by said fulcrum means, said cupped members overlapping axially of said shaft, and yielding means intermediate said outwardly cupped member and said lever ends.

16. In a clutch, the combination of a driving flywheel and driven shaft, a driven disc carried by said shaft, a pressure plate around said shaft, levers driven by said flywheel having their ends surrounding said shaft, fulcrum means for said levers, an inwardly opening cupped cover plate, an outwardly cupped member located in position by said fulcrum means, and yielding means intermediate said outwardly cupped member and said lever ends, said outwardly cupped member being telescoped axially of said shaft with respect to said pressure plate.

17. In a clutch, the combination of a driving flywheel and driven shaft, a driven disc carried by said shaft, a pressure plate around said shaft, levers driven by said flywheel having their ends surrounding said shaft, fulcrum means for said levers, an inwardly opening cupped cover plate, an outwardly cupped member located in position by said fulcrum means, and yielding means intermediate said outwardly cupped member and said lever ends, said outwardly cupped member being telescoped axially of said shaft with respect to said pressure plate, and with respect to said inwardly cupped member.

18. In a clutch, the combination of a driving flywheel and driven shaft, a driven disc carried by said shaft, a pressure plate around said shaft, levers driven by said flywheel having their ends surrounding said shaft, fulcrum means for said levers, yielding means adapted to actuate said levers for moving said pressure plate, lever positioning means surrounding said shaft and being substantially U-shaped in cross-section with the legs of the U extending generally radially of said shaft, said levers having their ends located in said U-shaped positioning means, and pins spaced around said shaft and extending across said U-legs, said levers having their said ends bearing on said pins.

19. In a clutch, the combination of a driving flywheel and driven shaft, a driven disc carried by said shaft, a pressure plate around said shaft, levers driven by said flywheel having their ends surrounding said shaft, fulcrum means for said levers, yielding means adapted to actuate said levers for moving said pressure plate, lever positioning means surrounding said shaft and being substantially U-shaped in cross-section with the legs of the U extending generally radially of said shaft, said levers having their ends located in said U-shaped positioning means, and pins spaced around said shaft and extending across said U-legs, said levers having their ends recessed for engagement with said pins.

20. In a clutch, the combination of a driving flywheel and driven shaft, a driven disc carried by said shaft, a pressure plate around said shaft, levers driven by said flywheel having their ends surrounding said shaft, fulcrum means for said levers, yielding means adapted to actuate said levers for moving said pressure plate, lever positioning means surrounding said shaft and being substantially U-shaped in cross-section with the legs of the U extending generally radially of said shaft, said levers having their ends located in said U-shaped positioning means, and pins spaced around said shaft and extending across said U-legs, said levers having their said ends forked for engagement with a plurality of said pins.

21. In a clutch, the combination of a driving flywheel and driven shaft, a driven disc carried by said shaft, a pressure plate around said shaft, levers driven by said flywheel having their ends surrounding said shaft, fulcrum means for said levers, yielding means adapted to actuate said levers for moving said pressure plate, lever positioning means surrounding said shaft and being substantially U-shaped in cross-section with the legs of the U extending generally radially of said shaft, said levers having their ends located in said U-shaped positioning means, and pins spaced around said shaft and extending across said U-legs, adjacent levers bearing on a common pin.

22. In a clutch, the combination of a driving flywheel and driven shaft, a driven disc carried by said shaft, a pressure plate around said shaft, levers driven by said flywheel having their ends surrounding said shaft, fulcrum means for said levers, yielding means adapted to actuate said levers for moving said pressure plate, lever positioning means surrounding said shaft and being substantially U-shaped in cross-section with the legs of the U extending generally radially of said shaft, said levers having their ends located in said U-shaped positioning means, and pins spaced around said shaft and extending across said U-legs adjacent levers having complementary recesses for engagement with a common pin.

23. In a clutch, a driving element, a driven element, one of said elements being movably engageable and disengageable with the other to effect clutch engagement and disengagement, a laminated lever extending substantially radially of the axis of said driving element for moving said movable element, fulcrum means for said lever, and yielding means acting on the inner end of said lever.

24. In a clutch, a driving element, a driven element, one of said elements being movably engageable and disengageable with the other to effect clutch engagement and disengagement, a laminated lever extending substantially radially of the axis of said driving element for moving said movable element, fulcrum means for said lever, and yielding means acting on the inner end of said lever, said fulcrum means engaging said lever intermediate the ends thereof.

25. In a clutch, a driving element, a driven element, one of said elements being movably engageable and disengageable with the other to effect clutch engagement and disengagement, a laminated lever extending substantially radially of the axis of said driving element for moving said movable element, fulcrum means for said lever, and yielding means acting on the inner end of said lever, said fulcrum means engaging said lever intermediate the ends thereof and closer to the outer end than to the inner end.

26. In a clutch, a driving element, a driven element, one of said elements being movably engageable and disengageable with the other to effect clutch engagement and disengagement, a laminated lever extending substantially radially of the axis of said driving element for moving said movable element, fulcrum means for said lever, and yielding means acting on the inner end of said lever, said lever including a plurality of spring elements of substantially equal length.

27. In a clutch, a driving element, a driven element, one of said elements being movably engageable and disengageable with the other to effect clutch engagement and disengagement, a laminated lever extending substantially radially of the axis of said driving element for moving said movable element, fulcrum means for said lever, and yielding means acting on the inner end of said lever, said lever including a plurality of substantially flat spring elements.

28. In a clutch, a driving element, a driven element, one of said elements being movably engageable and disengageable with the other to effect clutch engagement and disengagement, a laminated lever extending substantially radially of the axis of said driving element for moving said movable element, fulcrum means for said lever, and yielding means acting on the inner end of said lever whereby to flex said inner end increasingly as the lever is loaded by said yielding means.

29. In a clutch, a driving flywheel and pressure plate, a driven disc structure located between said flywheel and pressure plate, a driven shaft, a plurality of substantially flat levers adapted to move said pressure plate, said levers having their inner ends extending generally radially of said driven shaft, and means simultaneously engaging said levers for actuating the inner ends of said levers whereby said levers are flexed substantially uniformly.

30. In a clutch, a driving flywheel and pressure plate, a driven disc structure located between said flywheel and pressure plate, a driven shaft, a plurality of substantially flat levers adapted to move said pressure plate, said levers having their inner ends extending generally radially of said driven shaft, and means for actuating the inner ends of said levers whereby said levers are flexed convexly toward said pressure plate.

31. In a clutch, a driving pressure plate, a driven disc structure, a driven shaft, a plurality of substantially flat flexible levers extending generally radially of said shaft, said levers having forked inner ends around said shaft and having outer ends adapted to actuate said pressure plate.

32. In a clutch, a driving pressure plate, a driven disc structure, a driven shaft, a plurality of substantially flat levers extending generally radially of said shaft, said levers having forked inner ends around said shaft and having outer ends adapted to actuate said pressure plate, said levers together being substantially triangularly arranged about said shaft.

33. In a clutch, driving and driven elements adapted for clutching action, a forked laminated lever, and means actuating said lever for moving one of said elements.

34. In a clutch, the combination of a driving flywheel and a driven shaft, a driven disc carried by said shaft, a pressure plate around said shaft, a plurality of levers driven with the flywheel and having their ends positioned about said shaft, fulcrum means for said levers, means for supporting said fulcrum means from said flywheel, spring means acting on the inner ends of said levers for moving said pressure plate, and means associated with said fulcrum means and separate from said fulcrum supporting means providing an abutment for said spring means.

35. In a clutch, a driving flywheel, a pressure plate movable axially of said flywheel, a driven disc structure located between said flywheel and pressure plate, a driven shaft connected with said driven plate whereby to receive the drive therefrom, a plurality of substantially flat levers adapted to move said pressure plate and having their inner ends grouped about said driven shaft, said levers having their outer ends spaced axially from said pressure plate so as to lie outwardly from said shaft and from the said inner ends of said levers, and means simultaneously engaging said inner lever ends whereby said levers are flexed substantially uniformly in applying pressure to said pressure plate.

36. In a clutch, a driving flywheel and pressure plate, a driven disc structure located between said flywheel and pressure plate, a driven shaft, a plurality of substantially straight line levers adapted to move said pressure plate, said levers having their inner ends extending generally outwardly of said driven shaft, and means simultaneously engaging said levers for actuating the inner ends of said levers whereby said levers are flexed out of said substantially straight line substantially uniformly.

ANDRE J. MEYER.